Sept. 28, 1965     B. L. DOUGLAS     3,208,398
FLUID OPERATED FLOW VALVE AND METHOD
Filed Oct. 15, 1962     2 Sheets-Sheet 1
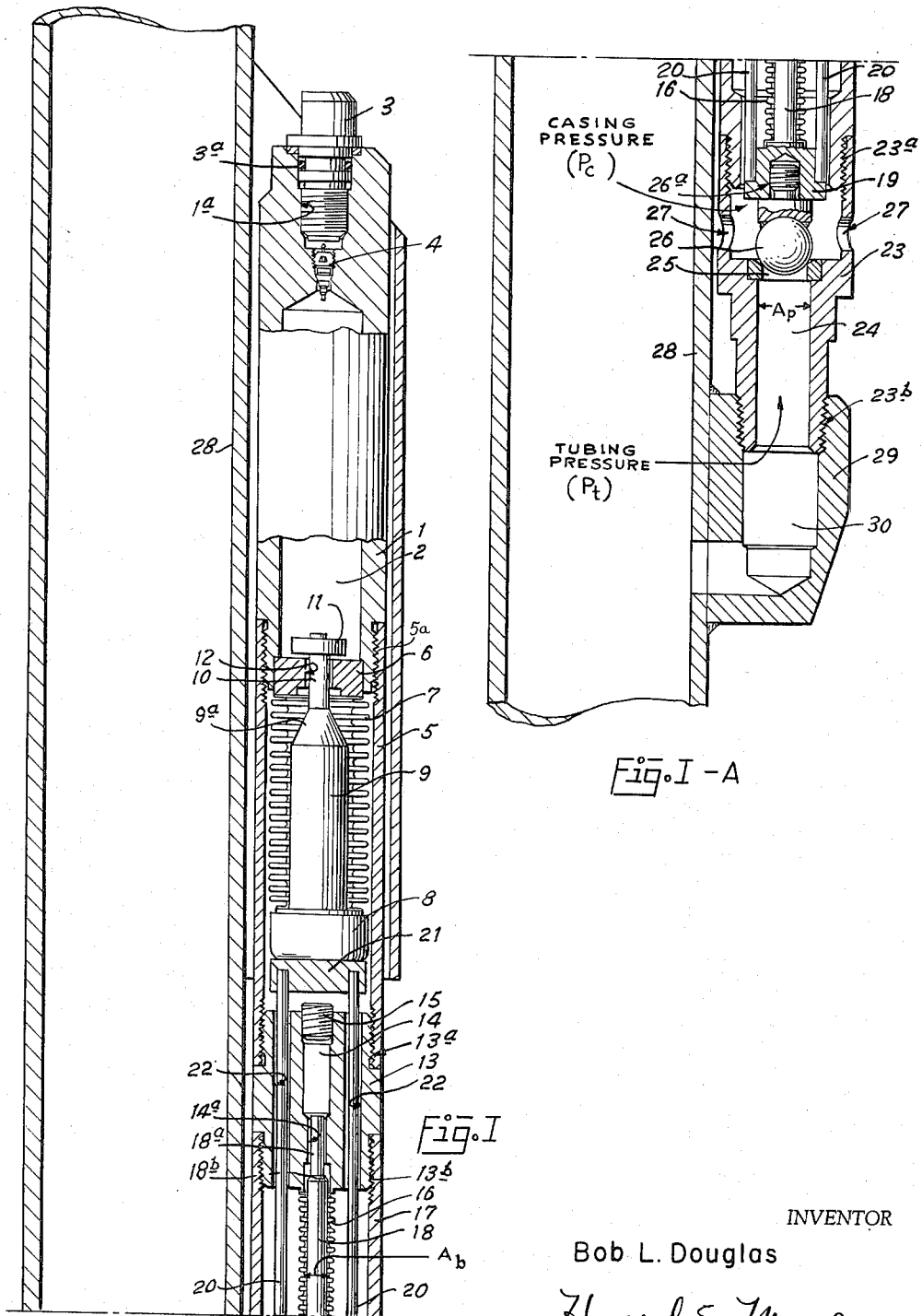
INVENTOR
Bob L. Douglas
BY Howard E. Moore
ATTORNEY Sept. 28, 1965   B. L. DOUGLAS   3,208,398
FLUID OPERATED FLOW VALVE AND METHOD
Filed Oct. 15, 1962   2 Sheets-Sheet 2
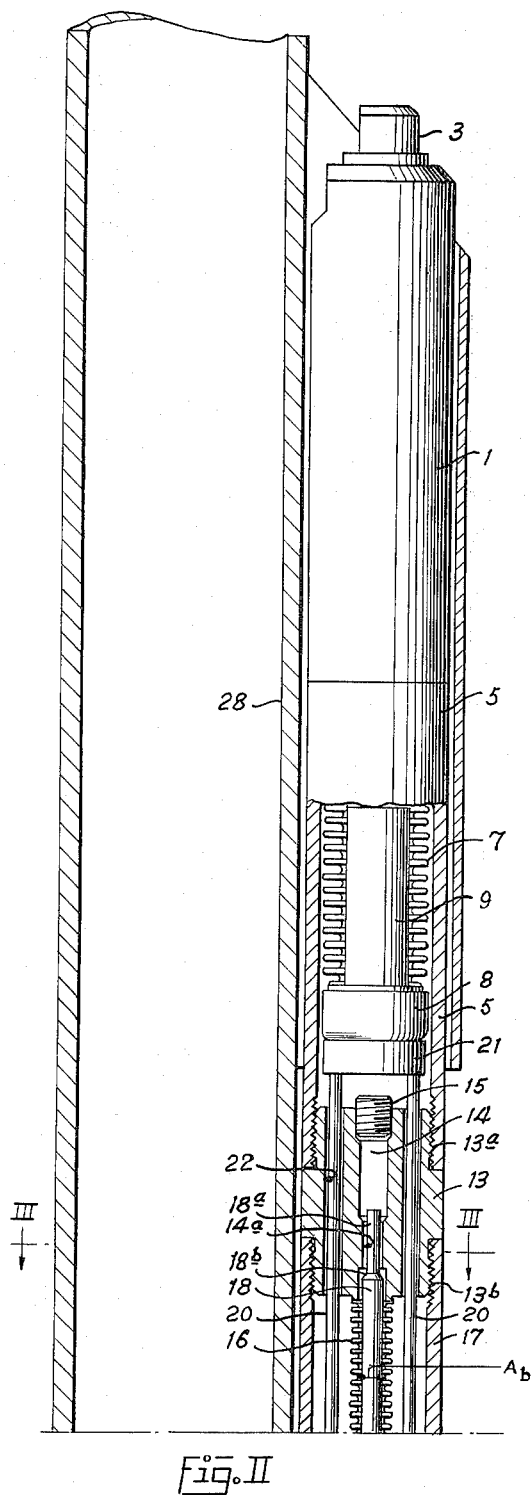
Fig. II
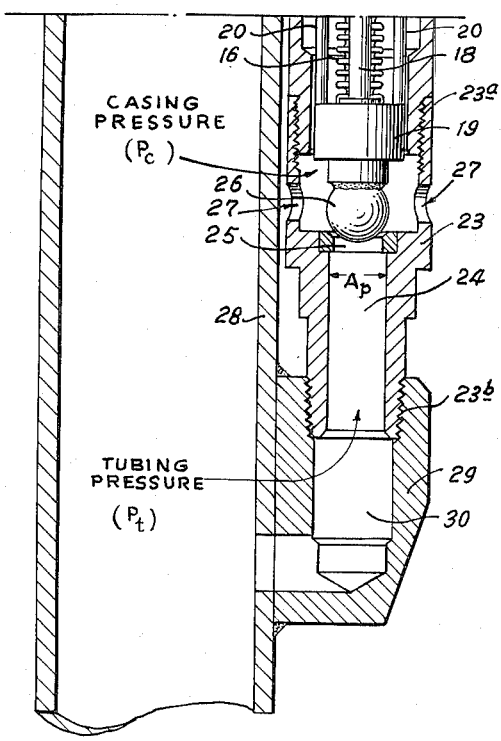
Fig. II-A
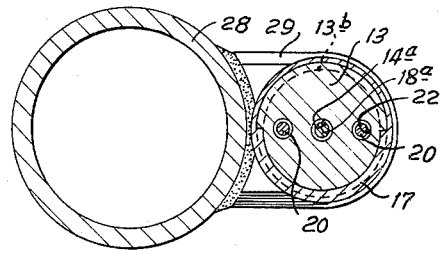
Fig. III
INVENTOR
Bob L. Douglas
BY Howard E. Moore
ATTORNEY

United States Patent Office 3,208,398
Patented Sept. 28, 1965

3,208,398
FLUID OPERATED FLOW VALVE AND METHOD
Bob L. Douglas, Dallas, Tex., assignor to Dresser Industries, Inc., Dallas, Tex., a corporation of Delaware
Filed Oct. 15, 1962, Ser. No. 230,609
9 Claims. (Cl. 103—232)

This invention has to do with a gas lift flow valve and method of gas lifting fluids in wells, and is particularly concerned with a fluid operated gas lift flow valve, which is opened and closed with a snap action.

The two general types of gas lift flow valves are: (1) Fluid operated valves; and (2) pressure operated valves. A fluid operated valve is a valve which is responsive to variations in pressure in the tubing string to open and close same. A pressure operated valve is a valve which is opened and closed by variations of pressure in the casing annulus injected from the surface.

Snap action opening and closing of fluid and pressure operated gas lift valves has not heretofore been possible with the valve constructions heretofore known.

Opening and closing snap action has heretofore been obtained in limited conditions with pilot operated valves, but only when a certain rate of bleed-off or orifice flow was obtained. However, these conditions are difficult to obtain due to the varying conditions in the well, such as depth, viscosity and temperature of well fluids.

The valve construction disclosed herein, and method herein described, provides a snap action in both opening and closing of the valve solely in response to the variations in pressure present in the tubing string at the location of the valve.

It is a primary object of the present invention to provide a fluid controlled flow valve wherein both the opening and closing of the flow valve is controlled solely by variations of pressure in the tubing string. Fluid controlled flow valves heretofore known have satisfied the requirements of opening solely in response to pressure rise in the tubing string, but do not close solely in response to a drop in pressure in the tubing string. As a result, so-called fluid controlled flow valves heretofore employed, have been highly inefficient in the use of gas due to the fact that their closing cycle consists of a "floating action" wherein the valve stem gradually moves toward the seat to close off the flow of gas from the casing annulus into the tubing, as the tubing pressure drops. Thereby a greater volume of gas is injected into the tubing than is required to lift a given volume of fluid.

With the use of the present valve construction and method, the volume of gas injected into the tubing required to lift a given volume of fluid through the tubing may be exactly predetermined and regulated, resulting in a great saving in lifting gas.

The present valve construction and method also provides a flow valve and method which permits fluid operated valves to be employed in dually completed wells in which two zones of production are simultaneously produced through separate strings of tubing.

When two strings of flow valves are used in a common gas reservoir, such as the casing annulus in a dually completed well, each string of flow valves must have definite control characteristics, to compensate for differences in pressure, rate of flow, temperature, etc. of the different zones, except in the almost non-existent circumstance when both zones of production are identical in flow characteristics, and remain identical after being put on production.

As a practical matter, it has been the accepted practice in gas lifting dually completed wells to run one string of pressure controlled flow valves, which are controlled by manipulation of pressures at the surface, and to run a second string of fluid controlled or automatic flow valves wherein the opening and closing characteristics are dependent on variations in pressure in the tubing.

The present invention provides a positive fluid controlled flow valve, the opening and closing of which depends entirely upon the variations in the tubing pressure, and same can be practically and efficiently used in dually completed wells, resulting in a saving in installation cost, servicing and gas used for production.

Another important object of the present invention is to provide a flow valve which will open at a constant ratio between the casing pressure and the tubing pressure adjacent the valve. It is well known that the most efficient and optimum operation of a gas lift flow valve is dependent upon the ratio between the casing pressure and the tubing pressure, which is expressed as $Pc/Pt$, wherein $Pc$ represents casing pressure and $Pt$ represents tubing pressure. By the use of the present valve and method, a constant ratio between the casing pressure and tubing pressure is provided, which permits predetermining and forecasting of production, fall back and gas consumption, and which provides for a great savings in gas by being enabled to predetermine and inject the volume of gas required to lift a given volume of fluid to the surface.

The flow valve shown and described herein is so constructed and arranged as to open on the predetermined ratio of the casing to tubing pressures, providing the upper charged bellows assembly is contracted and moved out of the way of the main valve control assembly upon the casing pressure being raised above the pre-set charged pressure in the upper bellows assembly. The charged pressure in the upper bellows assembly establishes a minimum casing pressure at which the main valve can open at a constant ratio between casing and tubing pressure.

It is another object of the invention described herein to provide a valve construction and method wherein the ratio of the casing pressure to the tubing pressure at which the valve will open is determined and set by the ratio between the effective area of the bellows diaphragm of the main valve assembly, and the port size which the main valve assembly controls. Since this ratio is built into the valve and is a constant, the selection of a casing pressure above the minimum pressure necessary to move the upper bellows assembly out of the way of the main valve assembly enables the operator to pre-select the pressure and volume of injected gas to lift a selected quantity of fluid from a given depth in the tubing to the surface on each intermittent cycle. Therefore, the operator has the choice of loading the valve (allowing the well to fill in liquid above the valve) according to the well characteristics, but the actual operation of the valve will occur at the most efficient $Pc/Pt$ ratio, which can be predetermined from well conditions.

It is, therefore, a primary object of the invention to provide a flow valve and method whereby the amount of lifting gas employed per cycle can be predetermined and controlled in view of the optimum operating conditions of the installation. Since the casing spread (the difference between the casing pressure at the opening of the flow valve and the casing pressure at the closing of the valve) is determined by the casing opening pressure, which may be selected as above described, the amount of gas used in each cycle may be determined and forecasted, since the casing spread is the primary factor in making this determination.

Still another object of the invention provides a flow valve which will close with a snap action upon a decrease in tubing pressure substantially independent of the casing pressure. It has been established by experimental evidence that the most efficient intermittent gas lift installation is provided when the operating valve closes simultaneously upon the arrival of the slug of fluid at the surface. It has been established that there is a sudden drop in tubing pressure coincidental with the arrival of the slug of fluid at the surface, which simultaneously allows the valve described herein to close, to thereby permit the pressure in the casing to build up sufficiently for the next cycle of operation. Therefore, the valve is only opened, and gas is injected into the tubing for only a sufficient length of time, to lift a predetermined slug of fluid to the surface.

The surface control equipment is provided for use with the valve and method herein described of the pressure regulator type, wherein the control equipment is responsive to pressure variations in the casing to control the injection of gas into the casing. This is accomplished by a pressure regulator and motor valve, of conventional design, on the gas supply line, which allows gas to be injected into the casing to raise the pressure in the casing to a predetermined value at which the pressure regulator will close automatically. Such equipment is of conventional construction, but is a part of the method herein described.

Other and further objects of the invention will become evident upon reading the detailed specification hereinafter following, and by referring to the drawings annexed hereto.

A preferred embodiment of the valve construction incorporating the improved valve construction features and employed in the practice of the method herein described, is disclosed in the drawings wherein:

FIGURES I and IA show a cross-sectional, elevational view of the valve assembly with the valve in closed position, attached to a mandrel which would be incorporated in a string of tubing (not shown);

FIGURES II and IIA are a cross-sectional, elevational view similar to that shown in FIGURES I and IA, but showing the valve as it would appear in open position; and FIGURE III is a transverse, cross-sectional, view taken on the line III—III of FIGURE II.

Numeral references are employed to designate the various parts shown in the drawings, and like numerals indicate like parts throughout the various figures of the drawings.

The numeral 1 indicates a generally cylindrical hollow dome portion 1, having a pressure chamber 2 therein.

An interiorly threaded passage 1a is provided through the upper end of the dome portion 1 to communicate with the pressure chamber 2.

A filler valve 4 is threadedly attached in the lower end of the passage 1a. Pressure fluid may be injected into the pressure chamber 2, to charge the pressure chamber, and the bellows suspended thereto, with a predetermined pressure charge above atmospheric pressure for the purposes which will be hereinafter described.

The filler valve 4 is of the back pressure type, which is mechanically opened by an injection fitting, and automatically closes by back pressure upon removal of the pressure injection fitting.

After charging the pressure chamber 2 with a predetermined pressure charge, the upper end of the passage 1a may be closed and sealed by threading thereinto a closure cap 3, which has an O-ring seal 3a disposed thereabout to provide a seal.

A tubular bellows housing 5 is threadedly engaged at 5a to the lower end of the pressure dome 1, to surround and protect the bellows 7.

A partition 6 is secured in the lower end of the pressure chamber 2, and has a metallic bellows diaphragm 7 secured and suspended to the lower side thereof.

The bellows diaphragm 7 is closed at its lower end by a bellows base 8 secured and sealed thereto.

A bellows guide stem 9 is secured to, and extends upwardly from, the base 8 through the bellows diaphragm 7, said guide being arranged to limit the inward flexure of the bellows diaphragm 7 and hold same in axial alignment with the housing in which it is disposed, but leaving sufficient annular space between the inner edges of the corrugations of the bellows and the surface thereof, to permit distribution of pressure and fluid in the bellows corrugations.

A conical surface 9a is provided on the upper end of the bellows guide 9, which joins with a reduced diameter neck portion 10. The neck portion 10 extends through a central passage 12 provided through the partition 6, the said neck portion 10 being less in diameter than the passage 12, to provide an annular space between the neck portion 10 and the passage 12, for the free passage of pressure and fluid thereabout.

A cross head 11 is secured to the upper end of the neck portion 10 of the stem 9, said head being arranged to come into contact with the upper surface of the partition 6, to suspend the guide 9 and bellows 7 to the partition 6, to limit the axial extension of the bellows 7 to protect same against damaging distortion in the event the housing 5 is removed to inspect the bellows while charged with pressure.

Preferably the bellows 7 is filled with an incompressible liquid up to a level above the partition 6 so that upon the bellows 7 being exposed to excessive external pressure the corrugations of the bellows would be protected against damaging distortion by reason of the fact that the conical head 9a would come into contact with the lower side of the partition 6 and close the passage 12 therethrough, trapping the incompressible liquid in the bellows to prevent undue distortion and damage to the corrugations of the bellows.

A lower bellows assembly is provided which includes a lower hollow dome 13 which is threadedly secured to the lower end of the bellows housing 5 by threads 13a, and is threadedly secured to the lower bellows housing 17 by threaded connection 13b.

A chamber or hollow bore 14 is provided centrally of the lower dome 13, said chamber 14 being closed and sealed by a threaded plug 15.

A restricted passage 14a is provided through the lower end of the dome 13, and there is secured and sealed to the lower surface of the dome 13, about the passage 14a, a lower bellows diaphragm 16, which is surrounded and protected by a tubular housing 17 threadedly attached at its upper end to the dome 13 and threadedly attached at its lower end to the valve seat housing 23 by threads indicated at 23a.

A lower bellows guide stem 18 extends through the bellows 16, and has an upper end of restricted diameter 18a extending into the passage 14a. There is sufficient clearance between the end 18a and the passage 14a to allow free communication between the chamber 14 and the interior of the lower bellows 16.

The lower end of the bellows guide 18 is secured to a base 19, and the lower end of the bellows 16 is sealingly secured to the base 19.

Preferably the bellows 16 is filled with an incompressible liquid through the passage 14a, so that in the event the bellows 16 is subjected to excessive external pressure, the conical surface 18b on the guide 18 will come into sealing contact with the lower end of the passage 14a to trap the incompressible liquid in the bellows 16 to protect same against undue distortion and damage to the corrugations thereof by such excessive pressure.

The chamber 14 and bellows 16 are closed at atmospheric pressure, by the plug 15, after placing the incompressible liquid therein.

A plurality of guide rods 20 are in contact with the base 19 at their lower ends and movably extend through passages 22 provided through the body of the bellows head 13. There is sufficient clearance between the rods 20 and the walls of the passages 22 to permit free communication with the area below the head 13 for the purpose which will be hereinafter related.

The rods 20 are secured at their upper ends to the rod head 21. The head 21 is arranged to contact, but is not attached to, the upper bellows base 8.

The valve seat housing 23 is attached to the lower bellows housing 17 by threaded connection 23a, and is threadedly connected at its lower end to the mandrel base 29 by the threaded connection 23b.

The valve seat housing 23 has an axial passage 24 therethrough which communicates with a passage 30 provided through the mandrel base 29, which in turn communicates with the bore of the mandrel 28. The mandrel 28 is incorporated as a part of the tubing string through which production fluid is raised to the surface.

A valve seat 25 is provided in the upper end of the passage 24, the passage through which is controlled by a ball valve head 26. The valve head 26 is secured to an attachment extension, having a portion threadedly engaged in the lower end of the bellows base 19, as indicated at 26a.

A plurality of lateral ports 27 are provided through the wall of the valve seat housing 23 through which gas from the casing annulus surrounding the valve and mandrel may be admitted.

The operation and function of the valve assembly hereinbefore described and the practice of the method, is described as follows:

The upper bellows assembly made up of the dome 1, bellows 7, base 8 and guide stem 9, serves as the mechanism for the valve which holds the valve closed, and permits it to open when the pressure therein is overcome by casing pressure.

The pressure chamber 2 is charged and sealed with a predetermined pressure above atmospheric pressure which must be overcome by the casing pressure before the valve can open.

A pressure regulator and motor valve combination (not shown) is disposed in the gas supply line at the surface which is open to allow gas injection and pressure build-up in the casing annulus between the casing and the tubing when the pressure is of a certain value below that required to overcome the pressure charge in the pressure chamber 2. When the pressure in the casing has been raised to a pre-determined value above that required to overcome the pressure charge in chamber 2, the pressure regulator will automatically close, closing the valve controlling admission of gas through the supply line, cutting off the supply of gas to the casing annulus.

The pre-determined maximum pressure thus produced in the casing annulus will be sufficient to overcome the pressure in the pressure chamber 2, thus allowing the contraction of the bellows 7 to raise the upper bellows base 8 to lift same out of contact with the rod head 21, thereby freeing the valve head 26 for upward movement when the tubing pressure has been raised to sufficient value to lift the lower valve head off its seat.

The casing pressure enters the ports 27, and the bellows 7 and 16 are exposed thereto, through the annular space between the lower base 19 and through the passages 22.

The valve head 26 is being held against the seat 25 by the casing pressure acting on the cross-sectional area of the passage 24, less the effective area of the lower bellows 16, as will be hereinafter explained.

When the well fill-in or fluid head in the tubing string creates a hydro-static tubing pressure to the required predetermined ratio to the casing pressure, the valve head 26 will be lifted off the seat 25, allowing gas to be injected into the tubing through the passages 24 and 30.

The sudden increase of pressure under the ball valve head 26 when it is raised will raise the ball valve 26 to full open position with a snap action.

The injection of gas from the casing into the tubing, decreases the casing pressure acting upon the upper bellows 7. When the casing pressure drops to a specific predetermined value, the charged pressure in the pressure chamber 2 will be greater than the casing pressure, causing the expansion of the bellows 7 to move the rods 20 downward, to thereby move the ball valve head 26 downward into engagement with the seat 25 to close the valve, in the event the valve has not already closed by drop in tubing pressure by a slug of fluid leaving the tubing at the surface. After the valve has closed, the surface pressure regulator, which has opened by drop in pressure in the casing during gas injection, will allow the injection of gas into the casing, and the build-up of pressure therein, until it reaches sufficient value to again overcome the pressure in the pressure chamber 2, contract the bellows 7, and move the base 8 upwardly to again allow the valve to open in the manner hereinbefore described.

It will be noted that the chamber 14 and bellows 16 of the lower bellows assembly, is preferably uncharged, i.e. such area is closed at atmospheric pressure, and that the effective area of the lower bellows 16 is relatively small as compared with the upper bellows 7. However, it will be understood that the chamber 14 could be sealed at a pressure above atmospheric, below the pressure in bellows 7, provided the desired casing pressure to tubing pressure ratio is acquired, as hereinafter explained.

The function of the lower bellows assembly is to subtract from the effective area that the casing pressure acts upon to keep the valve closed. The subtracted area would be the effective area of the bellows 16, substracted from the cross-sectional area of the port passage 24.

Therefore, the total effective area that the casing pressure acts upon prior to the opening of the valve, would be the area of the port 24 minus the effective area of the bellows 16, which is expressed by the formula $Pco(Ap-Ab)=$ the force to keep the valve closed.

"Effective area" of a bellows diaphragm may be defined as that area which determines the mechanical force which will be exerted by a pressure charged bellows diaphragm, which may also be expressed as the arithmetical means between the outside diameter and inside diameter of a corrugation of a bellows diaphragm (assuming the corrugations are all the same diameter and spacing).

The pressure in the tubing is exerted under the valve head ball 26, and across an area equal to the cross-sectional area $(Ap)$ of the port 24. Therefore, with bellows 16 sealed at atmospheric pressure the force to open the valve after the bellows 7 has contracted to move the bellows head 8 out of the way of the guide rod head 21 is the tubing pressure $(Pt)$ times the port area $(Ap)$, which may be expressed by the term $Pt(Ap)$, wherein $Pt$ equals tubing pressure and $Ap$ equals port area in square inches.

At impending motion, just prior to the opening of the valve, the force to open equals the force to close, which may be expressed by the formula $$Pt(Ap)=Pco(Ap-Ab)$$

or $$\frac{Pco}{Pt}=\frac{Ap}{Ap-Ab}$$

Therefore, it will be seen that the relationship between the port area $(Ap)$ of port 24 and the effective area $(Ab)$ of the bellows 16, determines the ratio of casing opening pressure $(Pco)$ and tubing opening pressure $(Pt)$ required to open the valve.

Since the ratio between the port area of port 24 and the effective area of bellows 16 may be built in, and is constant, then the ratio between the casing opening pressure and the tubing opening pressure would be constant for a particular valve.

Therefore, it can be exactly predicted in advance the exact volume of gas required and approximately the amount of fluid which will be lifted in a single cycle.

As heretofore stated, when a slug of fluid leaves the tubing at the surface, the valve will automatically close by a snap action, because the tubing pressure will be immediately lowered below that required to hold the valve open and the valve will be sucked to closed position. In the event the valve does not snap closed when a slug of fluid leaves the tubing at the surface, immediate pressure drop in the casing will allow bellows 7 to expand, thereby causing the bellows head 8 to push downwardly upon the rod head 21, and move the valve head 26 into seated position on the valve seat 25.

Closing of valve 26 closes off the flow of gas into the tubing string, allowing the pressure to build up in the casing through the pressure regulator and motor valve combination at the surface to the predetermined value for the beginning of another cycle of operation as hereinbefore explained.

There has thus been provided a flow valve which is fluid operated, i.e. operated by the pressure head in the tubing string, which has a snap action opening and a snap action closing.

Having described my invention, I claim:

1. In a flow valve, a pressure chamber, an upper sealed bellows diaphragm suspended below the pressure chamber and being in fluid communication therewith, said pressure chamber and bellows diaphragm being charged at a predetermined pressure above atmospheric pressure; a valve assembly attached below the upper bellows diaphragm including a sealed chamber; a lower bellows diaphragm suspended below the chamber and being in communication therewith; a valve head attached to the lower end of the lower bellows diaphragm; means carried by the valve head extending upwardly about the last-named chamber, contacting the lower end of the upper bellows, and being arranged to move upwardly and downwardly upon the opening and closing of the valve; and a valve seat housing attached below the lower bellows, said valve seat housing having lateral ports through the wall thereof, a valve seat centrally thereof arranged to receive the valve head, and an axial passage therethrough communicating with the lateral ports when the valve head is moved away from the seat.

2. The combination called for in claim 1 wherein the lower bellows diaphragm is less in cross-sectional area than the upper bellows diaphragm.

3. The combination called for in claim 1 wherein the lower bellows diaphragm is sealed at atmospheric pressure.

4. The combination called for in claim 1 wherein the cross-sectional area of the axial port through the valve seat housing is greater than the effective area of the lower bellows.

5. The combination called for in claim 1 wherein the means connected to the valve head arranged to contact the upper bellows comprises, a plurality of guide members movably extending through passages provided about the lower chamber, and means attached to the upper ends of the guide members, arranged to contact the lower end of the upper bellows.

6. In a flow valve, a pressure chamber, an upper sealed bellows diaphragm suspended below the pressure chamber and being in fluid communication therewith, said pressure chamber and bellows diaphragm being charged at a predetermined pressure above atmospheric pressure; a valve assembly attached below the bellows diaphragm including a sealed chamber; a pressure responsive member suspended below the chamber and being in communication therewith; a valve head attached to the lower end of the pressure responsive member; means carried by the valve head contacting the lower end of the bellows diaphragm, and being arranged to move upwardly and downwardly upon the opening and closing of the valve; a valve seat housing attached below the pressure responsive member, said valve seat housing having lateral ports through the wall thereof, a valve seat and port centrally thereof arranged to receive the valve head, and an axial passage therethrough communicating with the lateral ports when the valve head is moved away from the seat.

7. The combination called for in claim 6, wherein the pressure responsive member is a bellows diaphragm.

8. The combination called for in claim 6 wherein the cross-sectional area of the axial passage through the valve seat housing is greater than the effective area of the pressure responsive member.

9. In a flow valve a sealed lower bellows diaphragm; a valve port with a valve seat therein; a valve head attached to the lower bellows diaphragm arranged to contact the seat to close the port; an upper sealed bellows diaphragm charged with an internal pressure above the pressure in the lower bellows diaphragm; means carried by the valve head extending upwardly about the lower bellows diaphragm and contacting the lower end of the upper bellows diaphragm arranged to exert downward force on the valve head independently of the lower bellows diaphragm to hold same against the seal until the charge in the upper bellows diaphragm is overcome by a greater external force to lift the lower end of the upper bellows diaphragm and relieve the pressure exerted thereby on the means extending upwardly about the lower bellows diaphragm; the cross-sectional area of the port being greater than the effective area of the lower bellows diaphragm.

References Cited by the Examiner

UNITED STATES PATENTS

| | | | |
|---|---|---|---|
| 2,368,999 | 2/45 | O'Leary | 103—232 |
| 2,698,024 | 12/54 | Canalizo | 137—155 |
| 2,761,465 | 9/56 | Garrett et al. | 137—155 |
| 2,797,700 | 7/57 | McGowen | 137—155 |
| 3,016,844 | 1/62 | Vincent | 103—232 |

LAURENCE V. EFNER, *Primary Examiner.*

UNITED STATES PATENT OFFICE
CERTIFICATE OF CORRECTION

Patent No. 3,208,398                          September 28, 1965

Bob L. Douglas

It is hereby certified that error appears in the above numbered patent requiring correction and that the said Letters Patent should read as corrected below.

Column 8, line 36, for "seal" read -- seat --.

Signed and sealed this 3rd day of May 1966.

(SEAL)
Attest:

ERNEST W. SWIDER                                        EDWARD J. BRENNER
Attesting Officer                                                  Commissioner of Patents